Figure 1:
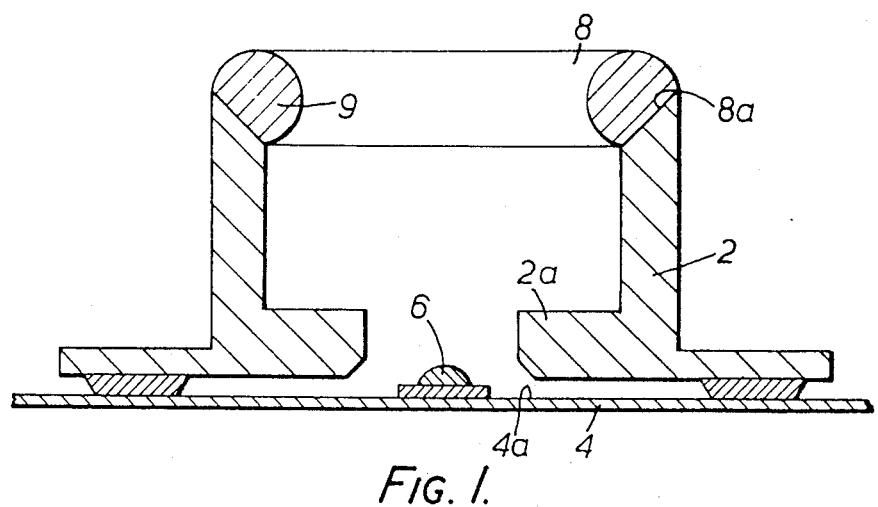

United States Patent [19]

Goodfellow et al.

[11] 4,357,072

[45] Nov. 2, 1982

[54] SEALING OPTICAL FIBRES INTO PACKAGES

[75] Inventors: Robert C. Goodfellow, Brackely; Andrew C. Carter, Greens Norton, both of England

[73] Assignee: Plessey Handel und Investments AG, Zug, Switzerland

[21] Appl. No.: 218,796

[22] Filed: Dec. 22, 1980

Related U.S. Application Data

[63] Continuation of Ser. No. 373, Jan. 28, 1978, abandoned.

[30] Foreign Application Priority Data

Jan. 28, 1978 [GB] United Kingdom ............. 03543/78

[51] Int. Cl.³ .................................................. G02B 7/26
[52] U.S. Cl. .................................. 350/96.20; 350/320
[58] Field of Search ............... 350/96.20, 96.21, 96.22; 357/81, 80, 74

[56] References Cited

U.S. PATENT DOCUMENTS

| | | | |
|---|---|---|---|
| 4,033,668 | 6/1977 | Presby | 350/96.21 |
| 4,118,100 | 10/1978 | Goell et al. | 350/96.20 |
| 4,119,363 | 10/1978 | Camlibel et al. | 350/96.20 |

FOREIGN PATENT DOCUMENTS

| | | | |
|---|---|---|---|
| 2710949 | 9/1977 | Fed. Rep. of Germany | 350/96.20 |
| 2721991 | 11/1978 | Fed. Rep. of Germany | 350/96.20 |
| 1511594 | 5/1978 | United Kingdom | 350/96.21 |

OTHER PUBLICATIONS

G. A. Wiliams et al., "Extraction of Image from Overly Low Temperature Cryostat using Fiber Optics" in Rev. Sci. Instrum., vol. 45, No. 8, Aug. 1974, pp. 1029–1030.

*Primary Examiner*—John D. Lee
*Assistant Examiner*—Frank Gonzalez
*Attorney, Agent, or Firm*—Fleit & Jacobson

[57] ABSTRACT

An optical fibre is sealed into a light emitting diode package by initially positioning the optical fibre above the L.E.D. and then melting a low melting point substance round the fibre and an upper support member, maneuvering the fibre until a maximum output is obtained and then allowing the low melting point substance to solidify while still holding the fibre in the optimum position.

2 Claims, 5 Drawing Figures

SEALING OPTICAL FIBRES INTO PACKAGES

This is a continuation of application Ser. No. 000,373 filed Jan. 28, 1978, now abandoned.

This invention relates to sealing optical fibres into packages to form an optical fibre assembly and more particularly to aligning and sealing a fibre into a light emitting diode package whereby a substantially hermetic seal is formed between the fibre and the package.

Previously the sealing materials have for the most part been epoxy resins which because of their long curing times require that alignment takes place over a substantial length of time. In addition epoxy resins because of their lack of stability at high humidity tend over a period of time to become less and less hermetic and also their mechanical clamping ability is reduced with time such that a fibre sealed into a package with this material tends to become misaligned. Also epoxy resins tend to be unsuitable for use under certain conditions for example high humidity.

Previously the methods of aligning the fibres have been time consuming and usually multistage. In addition optimisation of alignment was difficult due to the limited space available and the fact that parts of the assemblies would have previously been sealed to each other or that special apertures had to be created in the assemblies such that alignment could take place. Thus creating numerous seals each one of which would possibly in time become non-hermetic.

It is an object of the present invention to provide a substantially hermetic seal which due to the absence or presence of locally applied heat acts as a seal and mechanical clamp or a ductile area through which optimisation of alignment of the fibre is capable of being effected.

According to the invention there is provided a method of sealing an optical fibre into a package to form an optical fibre assembly which includes the steps of passing an end portion of an optical fibre held in positioning means through an aperture formed in a wall of a package such that at least a part of the end portion rests within the aperture in a manner whereby substantially all the fibre is axially aligned with the aperture; heating with heating means a low melting point annulus associated with at least a portion of an inner surface of the aperture such that the annulus is caused to melt thereby forming a ductile seal between the package and such that optimisation of alignment of the fibre is capable of being effected; and removing the heating means such that the ductile seal previously formed solidifies thereby forming a substantially hermetic seal combined with a mechanical clamp.

According to a feature of the invention there is provided a method of sealing an optical fibre into a package to form an optical fibre assembly which includes the steps of securing a cover of a light emitting diode package to a base to which is secured a light emitting diode such that an aperture in said cover is axially aligned with an active area of said light emitting diode; placing a solder annulus into the aperture of said cover; preparing a metallised optical fibre; securing a metal collar onto at least a part of the prepared portion of the fibre such that a non-metallised portion of the fibre projects away from one face of the collar; mounting a portion of the metal collar in a positioning means, positioning the remaining portion of the metal collar in the aperture such that the solder annulus is associated with a section of the remaining portion of the metal collar and the non-metallised portion of the fibre projects towards the active area of the light emitting diode; activating the light emitting diode; monitoring the electromagnetic radiation emanating from the active area of the light emitting diode which propagates along the length of the optical fibre such that alignment of the fibre is effected when a maximum amount of radiation propagates along the fibre; creating an inert atmosphere with the light emitting diode package; heating the solder annulus with heating means such that the solder annulus melts, thereby providing a ductile seal between the fibre and the light emitting diode package; optimising the alignment of the fibre with the light emitting diode; and removing the heating means such that the ductile seal previously formed solidifies thereby forming a substantially hermetic seal combined with a mechanical clamp.

Further according to the present invention there is provided apparatus which includes positioning means for passing an end portion of an optical fibre through an aperture formed in a wall of a package such that at least a part of the end portion rests within the aperture in a manner whereby substantially all of the fibre is axially aligned with the aperture; means for monitoring the optimum quantity of electromagnetic radiation emanating from or directed into said package via the fibre when said fibre is axially aligned with said package, said means being associated with the positions means; and heating means for heating a low melting point annulus associated with at least a portion of an inner surface of the aperture so that it is caused to melt.

Also according to the present invention there is provided an optical fibre assembly which comprises a package having an apertured cover attached to a base which has secured thereto a light emitting diode, a length of optical fibre projects through the aperture of the cover, the fibre being axially aligned with an active area of the light emitting diode, and held in a fixed relationship to the light emitting diode, a seal comprising an annulus of low melting point material, positioned in the aperture of said cover.

Preferably the optical fibre is metallized to provide rigidity, however, a short length of non-metallised optical fibre can be used.

Preferably the package is a light emitting diode package comprising a base to which the light emitting diode is secured and a cover.

Preferably the annulus of low melting point material consists of solder when a metallized fibre is used.

Preferably the annulus of low melting point material consists of low melting point glass when non-metallized fibre is used.

Preferably the metallized fibre is prepared by a series of steps which include etching away a portion of the metallised coating; cleaving the fibre at a point along a non-metallised portion of the fibre; plating a metal collar onto at least a part of the metallised portion of the fiber adjacent to the point of cleaving, and tinning the outer surface of the metal collar.

Figure 2:
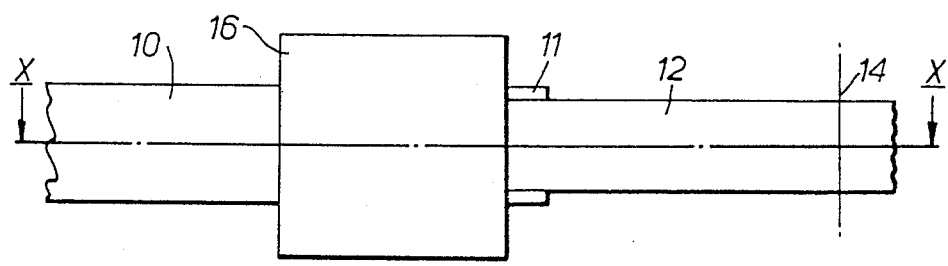
Figure 3:
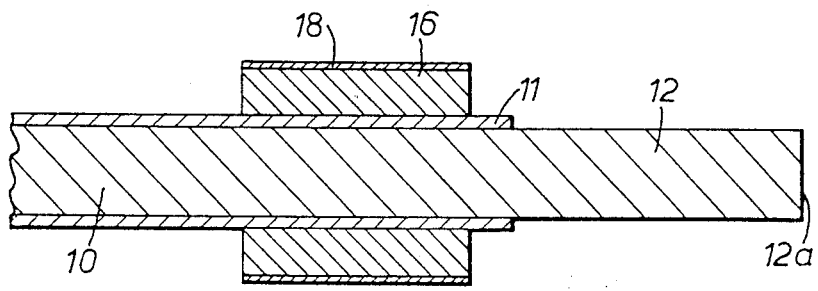
Figure 4:
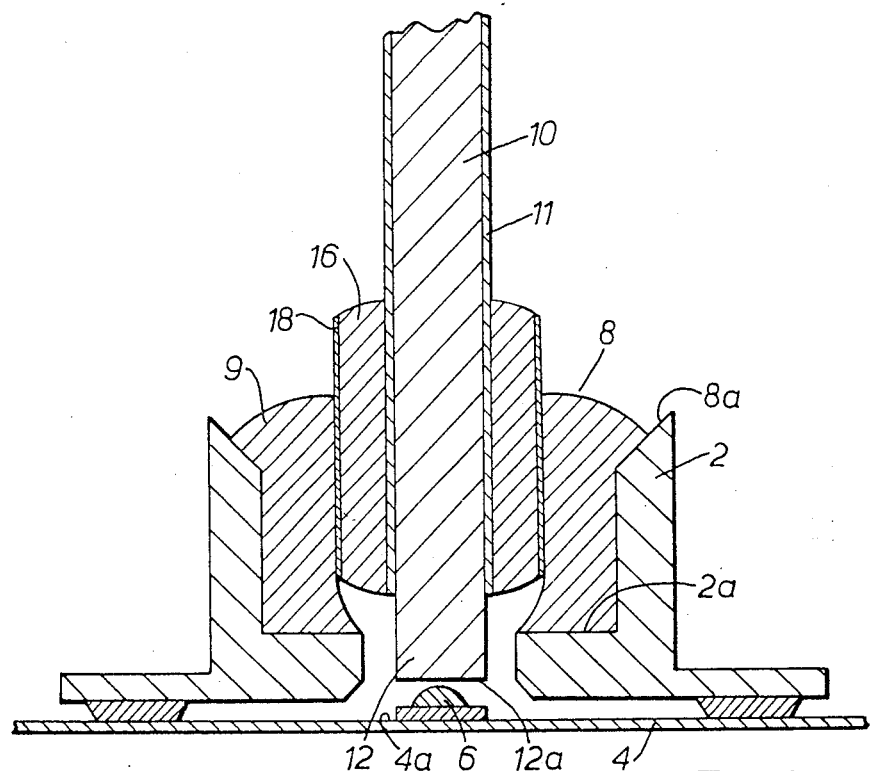
Figure 5:
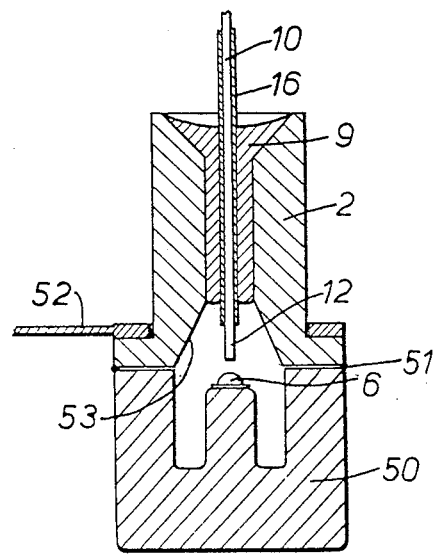

Embodiments of the invention will now be described by way of example only and as illustrated in the accompanying drawings in which:

FIG. 1 illustrates in cross sectional side elevation a light emitting diode package, FIG. 2 illustrates in plane view an optical fibre, FIG. 3 illustrates a cross section of the fibre of FIG. 2 taken along the line X—X, and FIG. 4 illustrates in cross sectional side elevation the optical fibre assembly according to the invention FIG. 5 shows in partial cross sectional side elevation a second optical fibre assembly according to the present invention.

The invention relates to a method of sealing an optical fibre into a package to form an optical fibre assembly by aligning an optical fibre with an apertured package such that a low melting point annulus associated therewith melts to provide a ductile seal. The heat is then removed so causing the ductile seal to solidify thereby providing a substantially hermetic seal in combination with a mechanical clamp.

Referring now to FIG. 1 of the drawings, the package for example, consists of a light emiting diode package which comprises a cover 2 and a base 4. A lensed emitting diode 6 is secured to a surface 4a of base 4. The cover 2 comprises a flanged tubular body having a cupped aperture 8 at one end which is adapted to receive an annulus of low melting point material, and at the other end a constriction 2a which is adapted to prevent the flow of the low melting point annulus material when molten onto the light emitting diode 6.

The first step of the method is to secure the cover 2 to the base 4 by, for example, welding so that the cupped aperture 8 is axially aligned with an active area of the light emitting diode 6.

Secondly a low melting point annulus 9 of, for example, solder is placed in the cupped aperture 8 of the cover 2, so that the annulus is in contact with the inner wall 8a of the cupped aperture 8.

With reference now to FIGS. 2 and 3 of the drawings, the optical fibre is prepared. This is achieved by taking an optical fibre 10, which has previously for example been metallized with gold, and etching away a portion of the metallized coating 11 to form a non metallized portion 12. Next at a point 14 along the non metallized portion 12, the fibre is cleaved or broken and polished to form a flat end face 12a.

The next step is to secure a metal collar 16 for example of copper onto the metallised portion of the fibre 10. This can be achieved for example, by electroplating. The outer surface of the collar 16 is then tinned such that the solder annulus 9 will adhere to it.

The next step of the method is to take the prepared fibre and place a portion of the metal collar 16 in a positioning means, for example, a micro-precision positioning means which is capable of movement in three dimensions. With the aid of the positioning means, (not shown), the non metallized portion 12 of the fibre 10 is then inserted into the cover 2 through the cupped aperture 8 as shown in FIG. 4 such that the end face 12a of the fibre is preferably situated just above the light emitting diode 6. In addition the remaining portion of the collar 16 not held in the positioning means is held at a distance from the walls of the cover and the annulus 9 so as to allow manipulation of the fibre to aid alignment of the fibre with the light emitting diode 6.

After this the light emitting diode 6 is activated such that it transmitts electromagnetic radiation which propogates along the fibre 10. This radiation is then monitored by, for example, a photodetector (not shown) which is associated with the positioning means. Monitoring of the transmitted radiation is continued in addition to manipulation of the fibre by the positioning means until the maximum amount of radiation propagated along the fibre is detected by the detector. When this is achieved the fibre is substantially in alignment with the light emitting diode 6.

The next step is to create an inert atmosphere within the light emitting diode package by for example, flushing the package with nitrogen. After which the annulus 9, is heated with heating means for example, a hot wire loop, (not shown) at a temperature in the range 150°–300° C. whilst the base of the light emitting diode package is cooled such that the solder annulus melts and adheres to the tinned layer 18 of the collar 16, and the walls of the construction 2a of the cover 2 (as shown in FIG. 4). The molten solder thus forms a ductile seal between the fibre and the light emitting diode package. Due to the seal being ductile final optimization of the alignment of the fibre with the package can take place at this stage. When final optimization of alignment has occured the heating means are removed thereby causing the ductile seal to solidify thus forming a substantially hermetic seal combined with the mechanical clamping of the fibre in alignment with the light emitting diode package. Once the seal has solidified the positioning means which are secured to a portion of the collar 16 are removed.

It should be noted that preferably the length of the non metallized portion 12 after cleaving is substantially equivalent to the distance from the base of the cupped aperture 8 to the surface of the light emitting diode 6. Also preferably the diameter of the collar 16 together with a tinning layer 18 should be such that the collar 16 does not project beyond the constriction 2a of the cover 2 when the annulus 9 is in place. In addition preferably the diameters of the cupped aperture 8 and the cover 2 are such that a collar diameter is allowed for manipulation when the fibre plus collar are inserted into the cover (as shown in FIG. 4).

It should be further noted that the aperture 8 of the cover 2 is cupped so that when the solder is molten it is prevented from flowing out of the cover and thereby on to the light emitting diode by the provision of a constritction 2a in the cover 2 below the depth to which the fibre and associated collar penetrates. The presence of solder on the light emitting diode would cause substantial lowering of the efficiency of propogation of transmission of the radiation along the fibre from the light emitting diode. Also cupped aperture is preferred as it prevents the flow of solder down the exterior surface of the package.

In preceding paragraphs the method has been related to a metallised fibre. This is because metallisation imparts rigidity to a relatively long length of fibre. However, alternatively a relatively short length of non-metallised fibre can be used in which case low melting point glass is used as the material for the annulus.

The main but not exclusive use of the method according to the invention is the sealing and aligning of optical fibres into light emitting diode packages, laser packages, detectors, directional couplers and connectors.

Referring now to FIG. 5 a second assembly is shown in which where possible the same reference numerals have been used to identify similar parts.

The diode and lens assembly 6 is mounted on a base heat sink 50 and the cover 2 is ring welded as shown at 51 to the base 50. Electrical contact is made to the L.E.D. by a collar 52 and a lead within the base 50 not shown.

The cover 2 is formed by drilling and turning or by casting a nickel iron alloy to the shape as shown in FIG. 5 except that the countersunk portion 53 is not initially formed. The cover 2 is then gold plated and the countersink 52 is formed. Thus the sides of the countersink 52 when formed are not gold plated.

The fibre is prepared in a similar manner to FIG. 4 but the collar 16 is more elongated and is formed as follows. A portion 12 of the fibre is firstly masked and then the fibre is dipped into a gold coating solution. The masking is removed and the fibre then fired to impregnate the gold coating into the fibre. The gold impregnated portion of the fibre is then copper plated to form the collar 16 and the collar is tinned as at 18 in FIG. 4. The tinning layer is so thin that for clarity it is not shown in FIG. 5.

The fibre is then inserted into the assembly via the hole in the collar 2 and positioned and soldered in position as hereinbefore described with reference to FIG. 4.

The absence of gold plating over the countersink area 53 means that the solder does not run freely over this area and remains as shown in the narrow constriction in the collar 2. The collar 16 is considered practically beneficial for two reasons. Firstly, it makes the end of the fibre more rigid and heavier enabling it to be moved with greater accuracy through the molten solder or epoxy resin which has quite a drag effect. Thus positioning is quicker. Secondly, by extending the collar 16 above the cover 2 the upstanding fibre is stronger and more able to withstand bending forces.

What is claimed is:

1. A method of sealing an optical fibre into a required position within a package having a wall which is discontinuous so as to form an aperture therein, comprising the steps of:

providing a positioning device;

holding said optical fibre in said positioning device adjacent to an end portion of said optical fibre;

inserting said end portion in an axial direction through said aperture formed in said wall of said package with said positioning device;

providing a piece of a low melting point material located adjacent to the periphery of said aperture;

heating said low melting point material until it becomes molten, and causing the material, when molten, to flow into said aperture so as to surround and form an annular ductile seal between said periphery of said aperture and said fibre;

maintaining said heat while moving said end portion in an axial and a radial direction with respect to the axis of said aperture in said wall of said package within said ductile seal with said positioning device until said end portion is in said required position relative to said aperture; and subsequently allowing said ductile seal to cool and solidify, so that said end portion is retained in said required position by said solidified material which provides both mechanical support and a hermetic seal between said optical fibre and said periphery of said aperture;

said method comprising the additional step of metallising the optical fibre over a short portion to be sealed within the package while maintaining the end portion of the fibre free from metallisation, wherein the low melting point piece of material is solder and wherein, during the heating process, the solder adheres only to the metallised portion of the fibre and therefore does not come into contact with the light emitting device;

wherein the metallised fibre is prepared by a series of steps which include coating a portion of the fibre with a gold solution, subjecting the coated portion of the fibre to a heating process to impregnate the gold into the fibre, cooling the coated portion of the fibre, copper plating the fibre to form a copper plate, and finally tinning the copper plate.

2. An optical fibre assembly manufactured in accordance with the method as claimed in claim 1, comprising a package having an apertured cover attached to a base which has secured thereto a light emitting diode, a length of optical fibre projecting through the aperture of the cover, the fibre being axially aligned with an active area of the light emitting diode, and held in a fixed relationship to the light emitting diode by a seal comprising low melting point material located between the periphery of said aperture and said optical fibre.

* * * * *

UNITED STATES PATENT AND TRADEMARK OFFICE
CERTIFICATE OF CORRECTION

PATENT NO. : 4,357,072

DATED : November 2, 1982

INVENTOR(S) : Robert C. Goodfellow

It is certified that error appears in the above—identified patent and that said Letters Patent is hereby corrected as shown below:

On the title page, the line designated "[63]" should read:

--[63] Continuation of Ser. No.373, Dec. 29, 1978, abandoned.--

Signed and Sealed this

Eighth Day of March 1983

[SEAL]

Attest:

Attesting Officer

GERALD J. MOSSINGHOFF

Commissioner of Patents and Trademarks